United States Patent [19]
Berman et al.

[11] Patent Number: 5,834,069
[45] Date of Patent: Nov. 10, 1998

[54] IN SITU METHOD FOR METALIZING A SEMICONDUCTOR CATALYST

[75] Inventors: Elliot Berman, Quincy; Anatoly Grayfer, Newton, both of Mass.

[73] Assignee: Zentox Corporation, Ocala, Fla.

[21] Appl. No.: 640,166

[22] Filed: Apr. 30, 1996

[51] Int. Cl.⁶ ............... B05D 03/06; C23C 16/48; B01J 19/08
[52] U.S. Cl. ............... 427/553; 427/581; 427/584; 427/197; 427/199; 427/205; 427/217; 422/186.3
[58] Field of Search ................... 427/553, 554, 427/555, 556, 557, 558, 581, 584, 197, 205, 217, 218, 199; 422/186.3

[56] References Cited

U.S. PATENT DOCUMENTS

| | | | |
|---|---|---|---|
| 4,264,421 | 4/1981 | Bard et al. | 427/581 |
| 4,303,486 | 12/1981 | Bard et al. | |
| 4,655,891 | 4/1987 | Ward et al. | |
| 4,788,038 | 11/1988 | Matsunaga | |
| 4,861,484 | 8/1989 | Litchtin et al. | |
| 4,888,101 | 12/1989 | Cooper | 204/157.15 |
| 4,892,712 | 1/1990 | Robertson et al. | |
| 4,966,759 | 10/1990 | Robertson et al. | 422/186 |
| 4,980,040 | 12/1990 | Lichtin et al | |
| 5,032,241 | 7/1991 | Robertson et al. | |
| 5,035,784 | 7/1991 | Anderson et al. | |
| 5,045,288 | 9/1991 | Raupp et al. | |
| 5,424,252 | 6/1995 | Monshita | 427/553 |
| 5,449,443 | 9/1995 | Jacoby et al. | 204/157.3 |
| 5,593,737 | 1/1997 | Meinzer et al. | 427/553 |
| 5,686,150 | 11/1997 | Matsumoto | 427/558 |

FOREIGN PATENT DOCUMENTS

| | | | |
|---|---|---|---|
| 81889 | 6/1983 | European Pat. Off. | 427/581 |
| 36-155678 | 8/1985 | Japan | 427/581 |
| 36-2109393 | 5/1987 | Japan | 427/581 |
| 40-2008371 | 1/1990 | Japan | 427/581 |

OTHER PUBLICATIONS

Matthews, R.W., "Photooxidation of Organic Impurities in Water Using Thim Films of Titanium Dioxide", *J. Phys. Chem.*, 1987, vol 91, pp. 3328–3333, No Month.

*Primary Examiner*—Marianne Radgett
*Attorney, Agent, or Firm*—Darby & Darby, P.C.

[57] ABSTRACT

A semiconductor catalyst is metalized in situ on a reaction support surface by illuminating at least a portion of the catalyst in the presence of a suitable source of metal to selectively deposit the metal on the illuminated portions. The source of metal can be applied to the reaction support surface either with the catalyst or separately, but is not attached to the catalyst until the structure is illuminated. This causes the metal to be deposited where the catalyst will be illuminated during use and therefore where photopromoted catalytic degradation can occur.

11 Claims, 1 Drawing Sheet

IN SITU METHOD FOR METALIZING A SEMICONDUCTOR CATALYST

BACKGROUND OF THE INVENTION

The present invention relates to a method for depositing a metal onto a semiconductor catalyst and, more particularly, to the photodeposition of metal onto a catalyst in situ on a reaction support surface for the photopromoted degradation of contaminants in a fluid stream.

Chemical and biological agents from a variety of sources present hazards to health and the environment, particularly when they enter the air we breathe and the water we drink. For this reason, there has long been a need for efficient, cost effective methods for removing contaminants from fluid streams. In addition to the obvious problems of water and soil remediation, indoor air pollution has recently been identified as a health risk. In each of these areas, the need for efficient solutions has become increasingly acute with the advent of more stringent regulatory standards.

Considerable effort has been expended in recent years toward the development of methods and techniques for removing destructive compounds and biological agents from fluid streams. A particularly promising approach is the photopromoted catalyzed degradation of such compounds and agents, which involves the oxidation and/or reduction and destruction of organic materials including bacteria, viruses and pesticides, inorganic materials including carbon monoxide, ammonia and hydrogen sulfide, and the removal of odors including, e.g. garlic odor and onion order. Such processes are disclosed in Lichtin et al., U.S. Pat. Nos. 4,861,484 and 4,980,040, Matsunaga, U.S. Pat. No. 4,788,038, Raupp et al., U.S. Pat. No. 5,045,288, and Bard et al., U.S. Pat. Nos. 4,264,421 and 4,303,486. Specific devices for these purposes are disclosed in Matthews et al., *J. Phys. Chem.* 1987, 91, 3328–3333; Robertson et al., U.S. Pat. Nos. 4,892,712, 4,966,759 and 5,032,241; and Anderson et al., U.S. Pat. No. 5,035,784. The disclosures of Bard et al., U.S. Pat. Nos. 4,264,421 and 4,303,486 are hereby incorporated by reference.

Photopromoted catalytic degradation involves exposing a contaminated fluid stream to a catalyst in the presence of air or oxygen and a light source which activates the catalyst. The catalyst used is often an oxide of a transition metal, such as $TiO_2$, but can also be any of a variety of other known semiconductor catalysts.

In most prior applications, a catalyst is either kept in a fluidized bed or coated onto the surface of a support for contact with a contaminated fluid stream. One common support surface is the smooth interior wall of a reaction vessel, which is typically made of glass. A more sophisticated arrangement is disclosed in Jacoby et al., U.S. Pat. No. 5,449,443, in which a catalyst is affixed to flexible strips exposed to a contaminated fluid stream. A blower unit moves the fluid through the flexible strips, and thus into contact with the catalyst. An ultraviolet light source irradiates the strips to activate the catalyst and oxidize contaminants in the fluid stream. Another approach, disclosed in U.S. Pat. No. 4,888,101 to Cooper, is to "entrap" the semiconductor, either within a layer of glass wool confined between two transparent plates or within pores on the surface of a solid support material.

As described in the Bard '421 patent, in many circumstances the presence of a suitable metal on the semiconductor catalyst increases the efficiency of the degradation process. Noble metals, such as platinum and/or palladium, are often used for this purpose; however, existing methods for distributing and affixing the metal tend to be wasteful of these costly materials.

More specifically, metal has heretofore been deposited onto a semiconductor catalyst in powder form by illuminating the powder in a suitable metalizing solution. The catalyst then must be filtered and washed thoroughly before use, however, before it is placed in a fluidized bed or other reactor structure for use in degrading contaminants in a fluid stream.

The filtering process is laborious and time-consuming, especially for ultra-fine particle size semiconductor catalysts like Degussa P-25 titania. If the catalyst is subsequently affixed to a support structure, metal will be present everywhere the catalyst is placed, regardless of whether the catalyst at a given location will be exposed to light in use. Much of the costly metal component is thus located where it cannot contribute to the degradation process.

Accordingly, there is a pronounced need for more efficient and more economic methods of metalizing semiconductor catalysts for the photopromoted catalytic degradation of compounds in a fluid stream.

SUMMARY OF THE INVENTION

The present invention involves the photodeposition of a suitable metal onto a semiconductor catalyst after the catalyst is affixed to a reaction support surface. Because the metal is deposited selectively where light impinges on the semiconductor catalyst, the distribution of metal can be partially controlled by controlling the distribution of light in the deposition process. Thus, metal can be deposited selectively on a single face or side of a reaction support surface, such as a fibrous matte web of the type used in many filtering applications. In one advantageous embodiment, the deposition of metal takes place in the actual photocatalytic reactor within which a particular support surface is to be used, or at least in a structure having a similar geometry. This causes metal to be deposited only where light impinges on the catalyst during use, thereby minimizing waste and process inefficiency. The resulting structure thus has metal deposited in a substantially uniform layer over the portions of the catalyst receiving light, and catalyst can be absent at locations which do not receive light during the photodeposition process.

The catalyst and the metal may be applied to the reaction support surface together, as in the form of a slurry, or may be applied separately. In either case, the two elements are initially separate and the metal is deposited onto the catalyst only with the incidence of light. Thus, the catalyst undergoes metalization in situ on the catalyst support surface itself.

Accordingly, the method of the present invention for metalizing a semiconductor catalyst comprises the steps of: providing a semiconductor catalyst on a reaction support surface with a source of metal in proximity to the catalyst; and illuminating at least a portion of the reaction support surface and the catalyst in the manner the catalyst is later to be illuminated in use, thereby depositing the metal selectively on the illuminated portions of the catalyst. More specifically, the illumination step may involve placing the semiconductor catalyst in a reaction chamber or other structure configured to illuminate the catalyst support surface in the manner it will be illuminated during use in the catalytic degradation of compounds in a fluid stream. The catalyst and the source of metal can be introduced to the reaction chamber together, as in the form of a single slurry, or separately.

BRIEF DESCRIPTION OF THE DRAWINGS

The above and other features of the present invention may be more fully understood from the following detailed description, taken together with the accompanying drawings, wherein similar reference characters refer to similar elements throughout and in which.

DETAILED DESCRIPTION OF THE DRAWINGS

Figure 1:
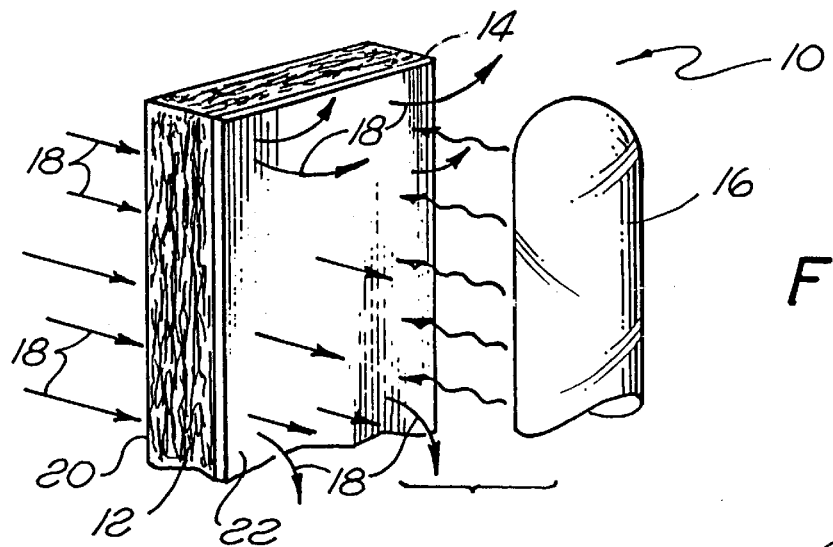
FIG. 1 is a diagrammatic view of a catalyst-coated reaction support surface under illumination to deposit metal in accordance with the teachings of the present invention, the thicknesses of the support surfaces and its coating being exaggerated for purposes of illustration.

Referring now to the drawings, FIG. 1 is a diagrammatic representation of a reaction environment 10 constructed according to one embodiment of the present invention. The reaction environment 10 contains a reaction support surface 12, which in the illustrated embodiment is a fibrous matte web supporting a semiconductor catalytic coating 14 irradiated by a light source 16. A contaminated fluid stream 18, which may be either gaseous or liquid, passes through the matte web 12 for reaction with the catalytic coating under exposure to light from the source 16. The reaction mechanism is photopromoted catalytic oxidation, which degrades chemical contaminants and destroys biological agents. The catalytic coating 14 is at least partially "metalized", i.e., coated with a suitable metal, to improve the efficiency of the chemical reaction and protect the catalyst.

As described in a copending U.S. patent application of Elliot Berman and Anatoly Grayfer entitled "Fibrous Matte Support and Method for the Photopromoted Catalyzed Degradation of Compounds in a Fluid Stream," Ser. No. 08/643,149, now U.S. Pat. No. 5,766,455 the disclosure of which is hereby incorporated by reference for all purposes, the matte web 12 may be a sheet-like body made up of a large number of densely-packed fibers forming a porous web which permits fluids to pass from one of its major surfaces, or "sides", to another. The web may be formed by a process similar to that used in the paper-making industry, using fibers of any suitable material. A binder will also typically be used to hold the fibers together without inhibiting the flow of fluids through the web.

The fibers of the matte web 12 may be made up of glass, cellulose or a suitable synthetic polymer, such as polyester, with glass being preferred in some circumstances. In one advantageous embodiment, the matte web 12 is a substantially self-supporting sheet through which air or other fluids can be passed in a lateral direction from a first major surface 20 to a second major surface 22. The semiconductor catalyst 14 is then distributed over the length and width of the matte web, sometimes selectively in the form of the coating illustrated in FIG. 1. In other cases, however, the catalyst is located on both major surfaces of the web, or distributed throughout its thickness. In each case, however, at least some of the catalyst must be disposed to receive light from the light source 16.

The semiconductor catalyst is metalized, as stated above, to enhance process efficiency and prevent deterioration of the catalyst. The metal used may be a noble metal, such as platinum, palladium, etc., and is affixed to the catalyst in situ after the catalyst is placed on the matte web. This is accomplished by irradiating the catalyst in the presence of a source of metal so that light hits the catalyst in the same pattern and at the same intensity as it does when the web is used in the degradation process. While not bound by any theory, it is believed that photons absorbed by the catalyst create charge carriers which interact with metal ions to bond the ions to the catalyst, causing the metal to be deposited selectively where light impinges. An advantageous manner of accomplishing this is to place a matte web containing a catalyst and a source of metal in the reactor within which the web will ultimately be used. Metal deposition occurs then automatically at the desired locations when the light source is activated, with less deposition of metal in "dark" areas.

One method of preparing the matte or other reaction support web 12 is to formulate a slurry containing the catalyst and the source of metal in an aqueous solution. Where the catalyst is titanium dioxide ("titania"), a useful form is Degussa P-25 sold by the Degussa Corporation. The slurry may then be composed, for example, of between five and nine parts de-ionized water and one part Degussa P-25, with between 0.01 and 0.10 percent of the metal source, based on weight of the titanium dioxide. When the metal is platinum, the source may be any suitable platinum-containing compound, as 0.01M hexachloro-platinic acid in 0.1M hydrochloric acid, neutralized with sodium carbonate and brought to a pH of about 4 by the addition of acetic acid. The slurry is coated onto the second major surface 22 of the matte web 12. Alternatively, the mixture may be coated onto both surfaces (20 and 22) of the web, or distributed through the thickness of the web. In the latter case, the slurry can be incorporated into the matte web during formation, either in an aqueous bath used to form the web (for "water laid" webs) or on the fibers themselves, by for example, spraying (for "air laid" webs). After the web containing the semiconductor catalyst is prepared, it is inserted into the reaction chamber and illuminated in exactly the way it will be illuminated when used to degrade contaminants.

In an alternate form of the method, the slurry is prepared by mixing de-ionized water with the same catalyst without a source of metal ions. The slurry is then coated or otherwise introduced into the matte web 12, after which a source of metal ions is separately introduced to the web. The source of metal ions may be the same as described above, but sprayed directly onto the matte web. The carrier is then exposed to illumination of appropriate wavelength, which may be accomplished by insertion into the reactor, for bonding of the metal to the catalyst in a distribution corresponding to the pattern of illumination in use.

Figure 2:
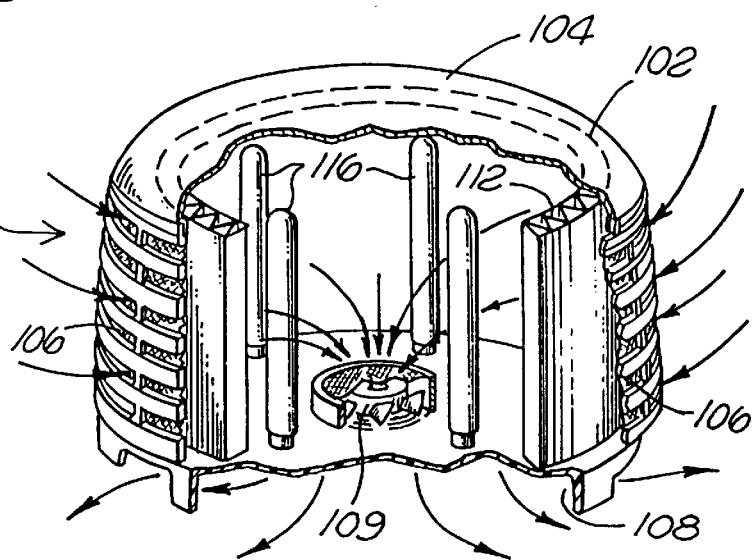
FIG. 2 is an isometric view, partially broken away, of a room air cleaner within which the metal deposition of the invention can take place.

Referring now to FIG. 2, an air cleaning apparatus 100 is one specific form of the reaction environment 10 of FIG. 1. The air cleaning apparatus 100 has a cylindrical reaction support structure 102 surrounding four spaced-apart light sources 116 parallel to its axis. The reaction support structure 102 is itself contained within a generally cylindrical housing 104, which defines a reaction chamber having inlets 106 through its side walls and an outlet 108 at its lower end. A fan 109 within the housing 104 draws air into the reaction chamber through the inlets 106 and the reaction support structure 102, and expels the air through the outlet 108. The reaction support structure 102 is fabricated from a matte web 110 similar to the matte web 10 of FIG. 1, but is pleated over its circumference to increase the surface area over which the degradation reaction takes place. The upper and lower ends of the reaction support structure 102 preferably form an effective seal against the interior housing 104 so that the fan 109 draws essentially all of its air inwardly through the reaction support structure 102 and expels substantially all of the air through the outlet 108. Of course, each of the variations of the matte web and the disposition of catalyst and metal described above with respect to the web 10, apply to the web 110, as well.

Although the semiconductor catalyst (not specifically shown) can be distributed throughout the web, if desired, it is advantageous in many situations to coat only the interior surface of the matte web 110 because it is only at that location that the catalyst receives light from the light sources 116. Even if the semiconductor catalyst and the source of metal ions are present elsewhere in the matte web 110, however, it is metalized only near its inner, illuminated surface when the in situ method is used.

The air cleaning apparatus 100 operates particularly well as a room air cleaner because any relatively large contaminants are filtered out by the matte web at its outer surface, and thereby separated from the activated portion of the semiconductor catalyst. Thus, the illuminated portion of the catalyst is not masked by such impurities, leaving it free to react with the gaseous or very small particulate contaminants that could not otherwise be removed from the air stream. Thus, the matte web 110 acts advantageously to mechanically filter large contaminants and chemically degrade hazardous Volatile Organic Compounds (VOC's) and other gaseous impurities. When glass fiber matte of the type used in HEPA (High Efficiency Particulate Air) filters is used, particles as small as approximately 0.3 microns in diameter are effectively removed by filtration.

Figure 3:
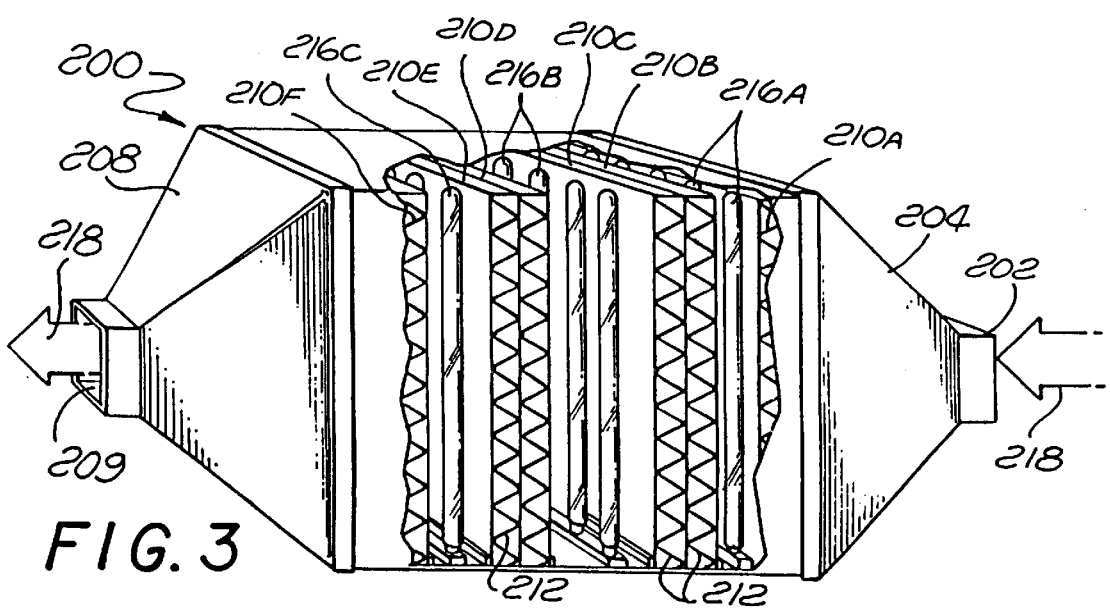
FIG. 3 is an isometric view, partially broken away, showing a fluid reactor, such as a ground water remediation reactor within which the metal deposition of the invention can take place. This reactor is useful, for example, in practicing one superior method of removing and destroying Volatile Organic Compounds (VOC's) in ground water. According to this method, a ground water stream is passed counter to an air stream (so called "air stripping") so that the VOC's enter the air stream. The air stream is then passed to a device like that illustrated in FIG. 3 for degradation of the VOC's.

Turning now to FIG. 3, an apparatus 200 is designed to remove contaminants from either gaseous or liquid streams containing concentrations of contaminants large enough that more than one "pass" through a catalyst support structure is required. The apparatus 200 has a fluid inlet 202 leading to a transition element 204 and ultimately to a principal reaction chamber 206, after which the stream is funneled down again by a transition element 208 to exit through a fluid outlet 209. Within the principal reaction chamber 206 are a plurality of reaction support structures, 210A, 210B, 210C, 210D, 210E and 210F. Each is pleated in the manner of the support structure 102 of FIG. 2, but arranged to form a substantially flat structure through which fluid passes in a transverse direction. These flat support structures are individually replaceable and are made up of a matte web material 212 which is the same as the webs 12 and 112 of FIGS. 1 and 2, respectively. When the apparatus 200 is used to clean a gaseous stream produced in the course of groundwater remediation, the reaction support structures 210A–210F may be pleated filters approximately two feet square and between one and two inches thick. Such filters in the illustrated arrangement are suitable for degrading a relatively large proportion of the contaminants in stream at flow rates of between 50 and 500 cubic feet per minute.

A plurality of coplanar light sources 216A are disposed between and parallel to the reaction support structures 210A and 210B, a similar series of coplanar light sources 216B are disposed between the reaction support structures 210C and 210D, and yet another series of light sources 216C are disposed between the reaction support structures 210E and 210F. The upper pleated surfaces of reaction support structures 210A, 210C and 210E, and the lower pleated surfaces of the reaction support structures 210B, 210D and 210F, are coated with semiconductor catalyst (not specifically shown) similar to the semiconductor catalytic coating 14 of FIG. 1, and are metalized in the manner described above in connection with the embodiments of FIGS. 1 and 2.

A fluid stream 218 entering the fluid inlet 208 is filtered by the matte web 212 of the reaction support structure 210A, mechanically removing the relatively large contaminants from the fluid stream. Contaminants too small for removal by the matte web 212 pass through the reaction support structures and contact the catalytic coatings thereon. Because the surfaces containing the metalized catalyst are illuminated by the light sources 216A, 216B and 216C, chemical and biological contaminants are effectively degraded within the principal reaction chamber 206. By the time the fluid exits the upper reaction support structure 210D, the level of contaminants is significantly reduced. If the various elements of the apparatus 200 are designed properly, the fluid leaving through the fluid outlet 209 has an average contaminant concentration well within acceptable environmental and health limits.

In each of the illustrated embodiments, the parameters of the light sources, the matte webs, the catalytic coatings and the metalized coatings are calculated to cause the semiconductor catalyst to be illuminated within a preselected range of optimal values appropriate for the chemical processes being performed. Contaminants are degraded through an oxidation process which requires the presence of oxygen or other suitable oxidizing agent. The oxygen content of air is usually sufficient for the reaction to proceed efficiently; however, oxygen may be added if desired.

For a light source of a given intensity, the amount of light reaching a particular portion of the semiconductor catalyst on the matte webs 12, 112 and 212, depends on both the inclination angle of the surface of the matte web relative to the incoming light and the distance of the matte web from the light source. The optical characteristics of the reaction chamber, and thus the efficiency of the photopromoted catalytic reaction, are controlled by selecting appropriate dimensions and shapes for the components involved. As a general rule, an increase in catalyst surface area lowers the average light intensity oil the catalyst itself. In the embodiments of FIGS. 2 and 3, multiple lamps are utilized within the reaction chamber to ensure that a sufficient number of photons are absorbed.

Light sources within the reactors of FIGS. 1–3 comprise at least one ultraviolet lamp capable of emitting light within the wavelength range of 175 to 500 nanometers (nm). In the illustrated embodiments, the light source is preferably one or more General Electric F40/BL lamps, which are 40 watt bulbs emitting radiation having a wavelength of approximately 360 nm, or Philips PLS 9W/10 lamps or Sylvania FC8T9/350/BL/RS lamps. Any other lamp or bulb emitting light capable of being absorbed by the catalyst can be used for this purpose, as well, including both medium and high pressure mercury vapor lamps and fluorescent lamps.

Because the deposition of metal according to the invention and the subsequent process of chemical degradation are accomplished with the same catalyst, similar light sources can and should be used for them. The shape of the reaction support and the geometry of the reaction chamber can vary significantly from one embodiment to the other, however. For example, the method and structure of the present invention are useful in the context of each of the embodiments of FIGS. 1–3, as long as the metal is deposited under the same or similar illumination conditions as the ultimate degradation process. The teachings are also applicable to any other reactor for the photocatalyzed degradation of compounds in a fluid stream, including the structures disclosed in U.S. Pat. No. 5,516,492 of Junchang Dong and Elliot Berman for "Apparatus and Method for the Photopromoted Catalyzed Degradation of Compounds in a Fluid Stream". In each case, the metal is deposited onto the catalyst in situ on the reaction support surface, often in the very reactor to be used in the degradation process. This results in substantial process and efficiency advantages over the prior art in which the semiconductor is coated with metal before it is placed on the reaction support.

The semiconductor catalyst of the present invention can be any of a variety of suitable semiconductor materials, but is preferably an oxide. One advantageous catalyst is titanium dioxide; however, other suitable catalysts, such as ZnO, $WO_3$ or their mixtures, can also be used. As noted above, the activity and selectivity of the catalyst can be improved by depositing noble metals (platinum, palladium, etc.) onto the catalyst by one of the methods described above.

In one advantageous embodiment, the catalyst can be introduced and the metal can be deposited in the process of forming the reaction support surface. This is particularly promising where the reaction support is a fibrous matte web made of glass, cellulose or other suitable fibers. The fabrication is then quite similar to a papermaking process or a process for making a filter media, and can be of either the water-laid or air-laid variety. The semiconductor catalyst, which can be titanium dioxide of the photoactive type, is then typically added to a slurry or other mixture from which the support is to be made. This causes the catalyst to be distributed throughout the thickness of the support. A suitable metal-containing substance is either added to the mixture or sprayed onto the support, after which the support is exposed to light of appropriate wavelength on one or both sides. This causes the metal to be deposited selectively onto the illuminated portions of the catalyst, where it increases the efficiency of the degradation reaction and protects the catalyst. Thus, the use of the metal is extremely efficient and there is no need to filter out catalyst particles for subsequent attachment to a reaction support surface.

In order that the invention be more clearly understood, the efficiency of the metalized catalyst of the present invention is further demonstrated by the following examples, which should not be construed to limit the scope of the invention. Each example compares the results achieved by passing an air stream containing a particular contaminant through a tubular reactor with an illuminated surface coated with non-metalized titania, as compared with a similar reactor coated with titania metalized in accordance with the teachings of the present invention. Each photocatalytic reactor is a Pyrex shell (52 millimeter inside diameter by 1200 millimeters length) having a catalytic coating on its inner wall and an axially-directed lamp surrounded by a protective Pyrex liner (45 millimeter outside diameter by 1200 millimeter length). The annular space between the shell and the liner, which is the volume of the reactor, is 590 milliliters. The reactions were conducted with a host air stream of high purity dry air from Wesco (Grade 2.0). All reactions were carried out at a pressure of 770 torr, and the reacted gases were analyzed by gas chromatography after exposure to the catalyst and the light for the indicated periods. The semiconductor catalyst used in the examples was P-25 titanium dioxide obtained from the Degussa Corporation and prepared in a slurry of the type described above in relation to the matte web of FIG. 1, including the metalized ion source described there. Metalization was accomplished by the in situ method described herein.

EXAMPLE 1

Table 1 compares the rate of removal of 2045 parts per million (ppm) of methanol from an air stream by passing it through tubular reactor structures with and without metalization of the titania catalyst. In the metalized case, metal and catalyst are supplied together from a slurry having a concentration of 0.05 percent metal by weight, based on the titania. As shown in Table 1, the rate of achieving ninety percent removal of methanol in this example is much greater for the metalized titania catalyst.

TABLE 1

| | % Removal | |
|---|---|---|
| Reaction Time | W/o metal | W/ metal |
| 0 | 0 | 0 |
| 1 | 8 | |
| 2 | 19 | |
| 3 | 29 | 40 |
| 4 | 34 | |
| 6 | 40 | 65 |
| 10 | 60 | |
| 12.5 | 71 | 96 |
| 18 | 88 | 100 |
| 25 | 99 | 100 |

EXAMPLE 2

Table 2 compares the rate of removal of 3500 ppm of hydrogen from an air stream by passing it through the illuminated reaction tubes of Example 1. The rate of removal is significantly better for the metalized catalyst case.

TABLE 2

| | % Removal | |
|---|---|---|
| Reaction Time | W/o Metal | W/ Metal |
| 0 | 0 | 0 |
| 40 | 18 | |
| 135 | 18 | 45 |

EXAMPLE 3

Table 3 compares the rate of removal of 60 ppm of FORMALDEHYDE from an air stream by passing it through the illuminated reactor of Example 1. The rate of removal is superior for the metalized catalyst case.

TABLE 3

| | % Removal | |
|---|---|---|
| Reaction Time | W/o Metal | W/ Metal |
| 0 | 0 | 0 |
| 1.7 | 20 | 50 |
| 3.5 | 32 | 70 |
| 5 | 50 | 73 |
| 6.5 | 72 | 100 |
| 10 | 100 | 100 |
| 13.5 | 100 | 100 |

EXAMPLE 4

Table 4 compares the rate of removal of 1000 ppm of ETHANOL from an air stream by passing it through the reaction tubes of Example 1. The rate of removal is superior for the metalized catalyst case.

TABLE 4

| Reaction Time | % Removal | |
|---|---|---|
| | W/o Metal | W/ Metal |
| 0 | 0 | 0 |
| 1.5 | 32 | 39 |
| 3 | 47 | 69 |
| 6 | 78 | 98 |
| 10 | 100 | |

EXAMPLE 5

Table 5 compares the rate of removal of 12 ppm of benzene by passing it through the metalized reaction tube of Example 1, for two different moisture levels. The first column shows the results with 0.8 percent moisture present and the second column shows the results with 2.8 percent moisture present. At the lower level of moisture, a yellow discoloration built up within the tube, indicating byproduct formation of the type encountered with nonmetalized titania. Discoloration was not present at the higher moisture content, which also removed benzene at a superior rate.

TABLE 5

| Reaction Time | % Removal | |
|---|---|---|
| | W/ Metal (0.8% water) | W/ Metal (2.88% water) |
| 0 | 0 | 0 |
| 3 | | 31 |
| 7 | 41 | 87 |
| 11 | 67 | 100 |
| 13 | 83 | 100 |
| 20 | 100 | 100 |

EXAMPLE 6

Table 6 compares the rate of removal of 10 ppm of carbon monoxide from an air stream by passing it through the tubular reactors of Example 1. The rate of removal for the metalized catalyst is orders of magnitude greater than for the nonmetalized catalyst.

TABLE 6

| Reaction Time | % Removal | |
|---|---|---|
| | W/o Metal | W/ Metal |
| 0 | 0 | 0 |
| 20 | 10 | 100 |
| 56 | 20 | 100 |
| 406 | 60 | 100 |

EXAMPLE 7

Table 7 compares the rates of removal of 35 ppm of carbon monoxide from an air stream by passing it through a tube with an illuminated surface coated with metalized titania according to the method of the present invention. The results shown are for three different metal concentrations, specifically, 0.01 percent, 0.05 percent and 0.10 percent platinum. All three of these values are percentages of platinum in the slurry, calculated by weight based on the titania present. Although the highest rate for this particular example was obtained with 0.05 percent platinum by weight, all of the metalized samples gave rates for greater than the nonmetalized titania data of Example 6.

TABLE 7

| Reaction Time | % Removal | | |
|---|---|---|---|
| | 0.01% Metal | 0.10% Metal | 0.05% Metal |
| 0 | 0 | 0 | 0 |
| 4 | 41 | 58 | 71 |
| 7 | 70 | 81 | 95 |
| 10 | 85 | 96 | 100 |
| 15 | 100 | 100 | 100 |

From the above, it can be seen that the in situ metalization method of the present invention provides a significant increase in efficiency over nonmetalized catalysts without the processing complexity encountered with prior art metalization methods.

The appended claims are not limited to the embodiments described herein, but rather are intended to cover all variations and adaptations falling within the true scope and spirit of the present invention.

What is being claimed is:

1. A method for metalizing a semiconductor catalyst for use in photocatalyzed degradation of compounds in a fluid stream comprising steps of:

providing the semiconductor catalyst affixed to a support surface and a source of metal in sufficiently close proximity to the catalyst to enable said source of metal to react with said catalyst; and illuminating at least a portion of said catalyst on said support surface to deposit said metal essentially only on said portion.

2. The metalization method of claim 1 wherein:

before said metal is deposited, the support surface is configured to receive light in a preselected pattern within a reaction chamber during the degradation of the compounds in the fluid stream; and said illumination step includes illuminating the semiconductor catalyst on the support surface in said preselected pattern to deposit said metal selectively on said catalyst.

3. The metalization method of claim 2 wherein:

said illumination step is performed in said reaction chamber.

4. The metalization method of claim 3 wherein the step of providing the catalyst and the source of metal comprises:

introducing the catalyst and the source of metal into the reaction chamber as a slurry.

5. The metalization method of claim 4 wherein the step of introducing the catalyst and the source of metal into the reaction chamber comprises:

preparing the slurry containing the catalyst and the source of metal; and coating at least a portion of the support surface with said slurry.

6. The metalization method of claim 1 wherein:

the semiconductor catalyst is affixed to the support surface before said illumination step.

7. The metalization method of claim 6 wherein the step of providing the semiconductor catalyst and the source of metal comprises:

affixing the catalyst to said support surface;

subsequently applying the source of metal to the catalyst; and thereafter performing said illumination step.

8. A method for metalizing a semiconductor catalyst for use in photocatalyzed degradation of compounds in a fluid stream comprising steps of:

provviding the semiconductor catalyst affixed to a fibrous matte web and a source of metal in sufficiently close proximity to the catalyst to enable said source of metal to react with said catalyst, the matte web being configured prior to metal deposition to receive light in a preselected pattern within a reaction chamber during the degradation of the compounds in the fluid stream; and illuminating at least a portion of said catalyst on said fibrous matte web in said preselected pattern thereby depositing said metal on said catalyst essentially only on the illuminated portion of the matte web.

9. A metalization method of claim 8 wherein:

the fibrous matte web has first and second major surfaces; and, the step of illuminating at least a portion of said catalyst on said fibrous matte web comprises illuminating one of said first and second major surfaces.

10. A method of metalizing a semiconductor catalyst within an illuminated reaction chamber having a light source for catalyzed degradation of compounds in a fluid stream comprising steps of:

providing the semiconductor catalyst affixed to a reaction support surface within said reaction chamber and a source of metal in sufficiently close proximity to the catalyst to enable said source of metal to react with said catalyst; and, illuminating at least a portion of said catalyst on said support surface using said light source to deposit said metal essentially only on illuminated portions of said catalyst.

11. The metalization method of claim 10 wherein:

said support surface includes a fibrous matte web having first and second major surfaces; and the step of illuminating at least a portion of said catalyst comprises illuminating one of said first and second major surfaces within said reaction chamber.

* * * * *